United States Patent [19]

Wang

[11] Patent Number: 4,927,120
[45] Date of Patent: May 22, 1990

[54] PORTABLE ELECTRICAL FAN

[75] Inventor: Jui-Shang Wang, Taipei, Taiwan

[73] Assignee: Duracraft Corporation, Sudbury, Mass.

[21] Appl. No.: 391,261

[22] Filed: Aug. 9, 1989

[51] Int. Cl.$^5$ .............................................. F16M 3/00
[52] U.S. Cl. .................................. 248/676; 248/125; 248/127; 248/146; 248/296
[58] Field of Search ............... 248/676, 678, 127, 146, 248/149, 176, 346, 124, 125, 287, 296, 278, 188.5; 416/246, 247 R, 244 R

[56] References Cited

U.S. PATENT DOCUMENTS

| | | | |
|---|---|---|---|
| 2,051,833 | 8/1936 | Ehrlich | 248/669 X |
| 2,433,280 | 12/1947 | Koch et al. | 416/244 |
| 2,470,694 | 5/1949 | Foo | 248/124 X |
| 3,446,429 | 5/1969 | Suzuki et al. | 416/246 X |
| 3,712,652 | 1/1973 | Uilkema | 248/188.5 X |
| 4,589,622 | 5/1986 | Hutter | 248/188.5 X |
| 4,696,450 | 9/1987 | Huang | 248/278 X |
| 4,746,273 | 5/1988 | Sun | 248/221.4 X |
| 4,850,804 | 7/1989 | Huang | 248/278 X |

Primary Examiner—Ramon O. Ramirez
Attorney, Agent, or Firm—John E. Toupal; Harold G. Jarcho

[57] ABSTRACT

A portable electric appliance including a standard; a fan assembly supported by one end of the standard and comprising a rotatable blade and an electrical motor operatively coupled to said blade assembly and a pedestal supporting an end of the standard opposite to the one end. Forming the pedestal are a hub having a tubular upright portion retaining the end of the standard opposite to the one end; a base portion defining a pair downwardly facing, orthogonally intersecting first and second U-shaped retainer portions; a first elongated U-shaped channel member having an upper wall, a pair of side walls projecting downwardly from the upper wall, and a central portion retained in the first retainer portion and having a slot extending transversely through lower portions of the side walls; and a second elongated U-shaped channel member having an upper wall, a pair of side walls projecting downwardly from the upper wall, and a central portion retained in the second retainer portion and having a slot extending through its upper wall and upper portions of its side walls, and wherein the slot in the first channel member engages the slot in the second channel member.

20 Claims, 2 Drawing Sheets

PORTABLE ELECTRICAL FAN

BACKGROUND OF THE INVENTION

This invention relates generally to a portable electrical fan and, more particularly, to a portable fan which is adjustable both vertically and angularly on an upright standard.

Portable electrical fans are utilized to create air flow and thereby enhance environmental conditions. To optimize the flow patterns produced thereby, many portable fans are provided with supports that permit selective orientation of a fan member on a supporting pedestal. Although various types of fan supports have been proposed, prior support mechanisms suffer from a number of individual and collective disadvantages such as high cost, cumbersome assembly and adjustment requirements, insufficient orientation adjustment capability, etc.

The object of this invention, therefore, is to provide an improved portable electrical fan that is relatively low in cost and can be easily assembled and during use can be adjusted and set into an extended range of vertical and angular positions.

SUMMARY OF THE INVENTION

The invention is a portable electric appliance including a standard; a fan assembly supported by one end of the standard and comprising a rotatable blade and an electrical motor operatively coupled to said blade assembly, and a pedestal supporting an end of the standard opposite to the one end. Forming the pedestal are a hub having a tubular upright portion retaining the end of the standard opposite to the one end; a base portion defining a pair downwardly facing, orthogonally intersecting first and second U-shaped retainer portions; a first elongated U-shaped channel member having an upper wall, a pair of side walls projecting downwardly from the upper wall, and a central portion retained in the first retainer portion and having a slot extending transversely through lower portions of the side walls; and a second elongated U-shaped channel member having an upper wall, a pair of side walls projecting downwardly from the upper wall, and a central portion retained in the second retainer portion and having a slot extending through its upper wall and upper portions of its side walls, and wherein the slot in the first channel member engages the slot in the second channel member. The mating hub and channel members simplify assembly and reduce cost of the pedestal.

According to features of the invention, the side walls of the first and second channel members are flexible and resilient, each of the retainer portions has an open lower end defining a pair of spaced apart inwardly projecting ears, and the distances between the outer bottom ends of the side walls of the first and second channel members are greater, respectively, than the spacing between the ears of the first and second retainer portion such that during insertion of the first and second channel members into the first and second retainer portions the lower ends of the side walls are first deflected inwardly by engagement with the ears and then after passing thereby spring outwardly so as to be retained thereby. This feature further facilitates assembly and reduces cost of the pedestal.

According to another feature of the invention, the channel members have open ends, and the pedestal includes an end cap closing each open end, the end caps having contact portions that project below the lower ends of said side walls. The contact portions provide a base that provides stability for the pedestal.

According to other features of the invention, each side wall has an opening adjacent each open end, the end caps extend within the open ends and have tab portions that are received by the openings, and the distance between the outer ends of the tab portions is greater than the spacing between the side walls such that during insertion of the end caps into the open ends the side walls are first deflected outwardly by engagement with the tab portions and then upon alignment thereof with the openings spring inwardly to move the tab portions into the openings. This structure simplifies assembly and reduces cost of the end caps.

According to still other features of the invention, the standard includes an elongated lower tubular member supported by the pedestal, an elongated upper tubular member having one end supporting the fan and adapted for axial sliding movement along an outer surface of the lower member, and a securing mechanism for securing the upper member to the lower member. In addition, a collar means is disposed at an opposite end of the upper member and receives the lower member. The collar means is adapted for rotational movement on the lower member between a removal position that permits axial separation of the upper member from the lower member and an engaged position that prevents separation thereof. These features provide in an inexpensive arrangement and the ability to conveniently adjust the vertical height of the fan above the pedestal.

According to a specific feature of the invention, an inner surface of the collar means defines a retainer slot having a first axially directed slot portion extending from an upper end of the inner surface; a second axially directed slot portion extending from a lower end of the inner surface, an inner end of the first slot portion is circumferentially spaced apart from an inner end of the second slot portion; and a transverse slot portion joins the inner ends of the first and second slot portions. In addition, an outer surface of the lower tubular member has a projection adapted for travel through the first slot portion during axial sliding movement of the upper tubular member, through the second slot portion during axial separation of the upper member from the lower member, and through the transverse slot portion during rotational movement of the collar means between its removal and engaged positions. The slot arrangement facilitates assembly and vertical adjustment of the standard.

Preferably, the collar means comprises a lower portion of the upper member and a collar member demountably mounted thereon, the first slot portion is formed in an inner surface of the lower portion of the upper member, the second and transverse slot portions are formed in an inner surface of the collar member, and the first slot portion extends along substantially the entire length of the upper member. This arrangement simplifies construction of the collar means.

According to another feature, the securing mechanism includes a flexible tab defined by the inner surface of the collar member and a screw threadedly engaged therein and disposed for movement into engagement with the flexible tab so as to cause deflection thereof into forcible engagement with the lower member. The engaged tab prevents sliding movement of the upper member on the lower member.

According to still other features of the invention, a coupling mechanism securing the fan to an upper end of the standard includes a neck member attached to the upper end of the standard means, a head member pivotally mounted on the neck member and attached to the fan, and connection means releaseably securing the head member means to the neck member. Also included is a stop for limiting angular movement of the head member on the neck member and a set means for fixing the angular position of the head member on the neck member. These features establish in an inexpensive arrangement the ability to conveniently adjust the angular position of the fan on the standard.

In a preferred arrangement, the connection means is adapted to permit engagement or disengagement of the head and neck members with a predetermined relative angular position existing therebetween and to prevent engagement or disengagement thereof with relative angular positions other than the predetermined position existing therebetween; and the appliance includes a manually actuatable latch movable between release and latching positions, the latch adapted in its latching position to prevent angular movement of the head member into the predetermined relative angular position and adapted in the release position to permit movement of the head member into the predetermined relative angular position. The latchable connection means facilitates assembly of the fan on the upper end of the standard.

According to an important feature, the lead member includes a yoke portion that includes a circularly cylindrical socket surface portion having a diameter D, and an open ended slot intersecting said socket surface portion and having a width t less than the diameter D; and the neck member includes a pin portion a circularly cylindrical outer surface portion with a diameter corresponding to the diameter D so as to permit fitted rotation of the outer surface portion within said socket surface portion, and intersecting surface means intersecting the outer surface portion so as to create for the pin portion boundaries that lie between planes separated by a distance less than t. The special pin facilitates assembly and disassembly of the device.

According to additional features of the invention, the latch includes an actuator arm on the neck member and defining a latch portion and manually movable between the latching and release positions, the latch portion adapted in its latching position to releaseably engage an engagement surface on the yoke portion and prevent movement of the head member into the predetermined relative angular position. This arrangement prevents inadvertent separation of the fan from the standard.

Preferably, the actuator arm is biased in the latching position, the engagement surface is formed by a cam surface on the yoke, and the cam surface is adapted to engage the latch portion and deflect the arm into the release position during angular movement of the head member between the predetermined angular position and the other angular positions. This arrangement facilitates assembly of the head and neck members.

DESCRIPTION OF THE DRAWINGS

These and other objects and features of the invention will become more apparent upon a perusal of the following description taken in conjunction with the accompanying drawings wherein:

FIG. 3 is an elevational view of a hub portion of the pedestal shown in FIG. 1;

FIG. 4 is a perspective view of an end cap used with the pedestal shown in FIG. 1;

FIG. 5 is an assembly view of an end cap and base channel member shown in FIG. 1;

FIG. 6 is an elevational view of an adjustable collar assembly shown in FIG. 1;

FIG. 7 is a transverse cross sectional view of the collar assembly shown in FIG. 6;

FIG. 8 is a bottom view of a collar member shown in FIG. 6;

FIG. 9 is a bottom view of the collar shown in FIG. 6;

FIG. 11 is a perspective view of a head member shown in FIG. 10;

DESCRIPTION OF THE PREFERRED EMBODIMENT

Figure 1:
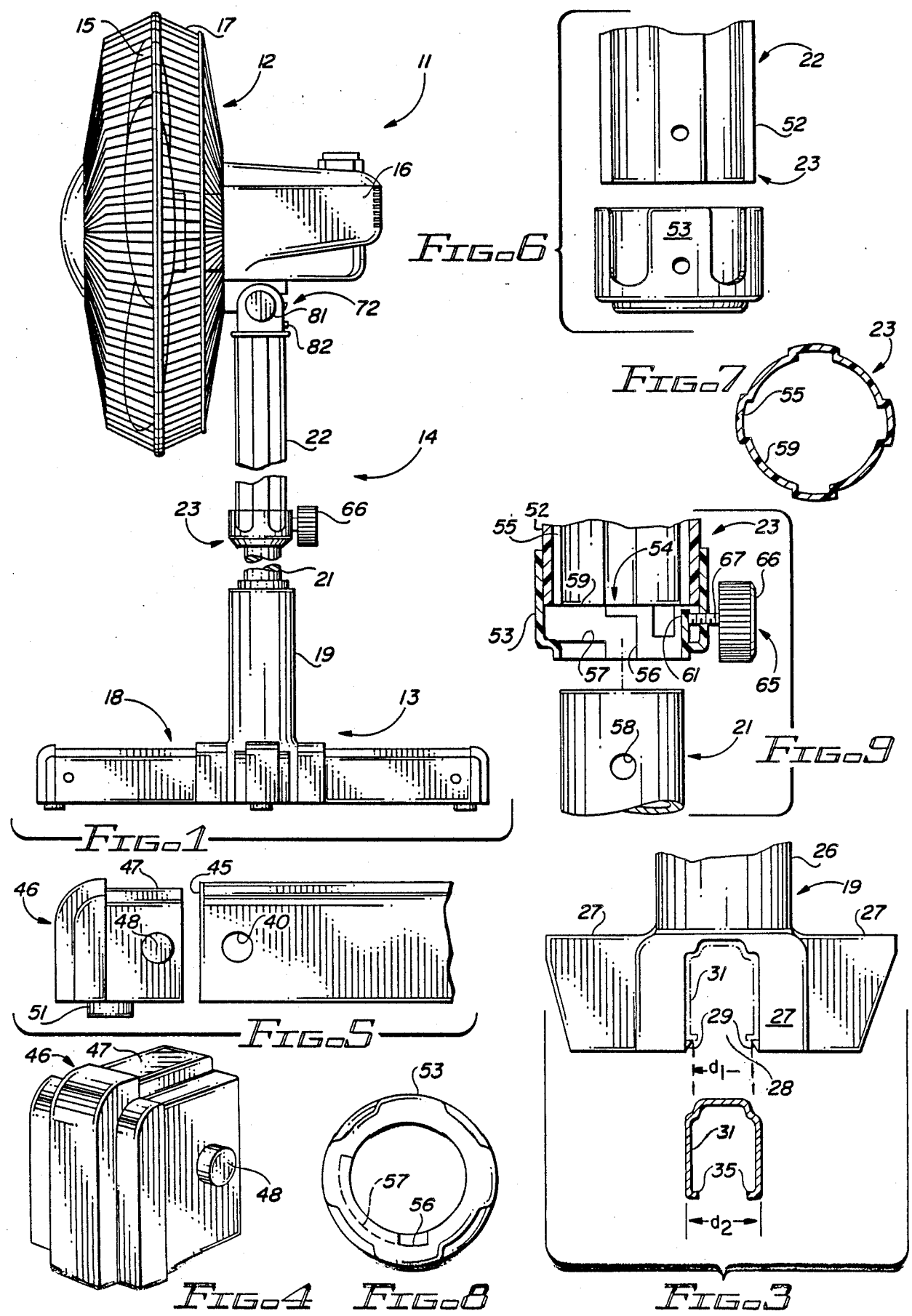
FIG. 1 is a right elevational view of a portable electrical fan according to the invention.

A portable appliance 11 includes a fan assembly 12 supported above a pedestal 13 by a standard 14. Included in the fan assembly 12 is fan blade 15 coupled to an electrical drive motor 16 and a protective cage 17. The pedestal 13 includes a base portion 18 and a hub portion 19. Forming the standard 14 are an elongated lower tubular member 21 having a lower end supported by the hub portion 19 and an upper end joined to an elongated upper tubular member 22 by an adjustable collar assembly 23. The fan assembly 12 is connected to an upper end of the standard 14 by a coupling assembly 25.

Figure 2:
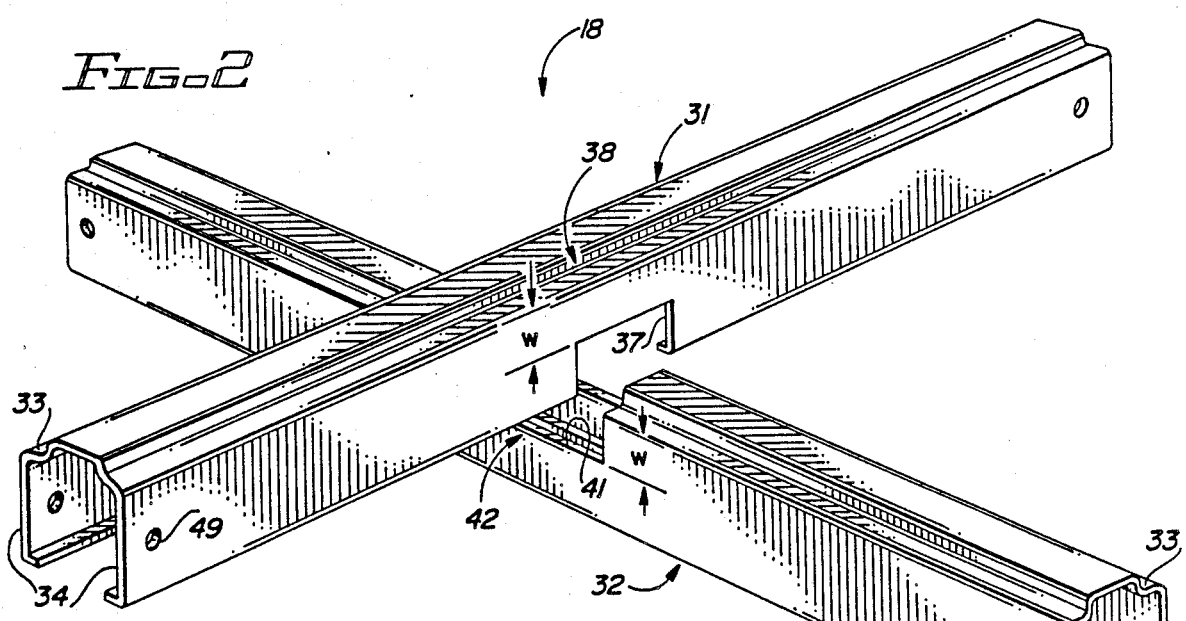
FIG. 2 is a perspective view of a portion of a pedestal assembly shown in FIG. 1.
Figure 12:
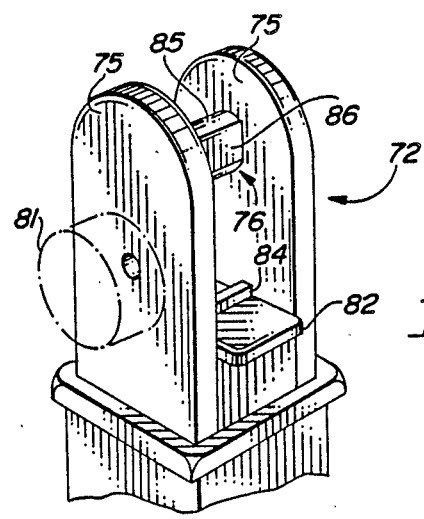
FIG. 12 is a perspective view of a neck member shown in FIG. 10.
Figure 10:
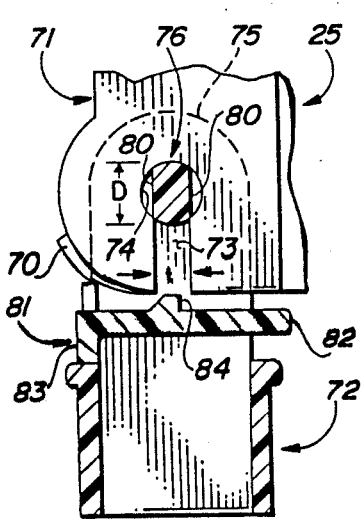
FIG. 10 is a view, partly in cross section, of a coupling assembly shown in FIG. 1.

Referring now to FIGS. 2 and 3 there is shown in greater detail the pedestal 13 shown in FIG. 1. The hub portion 19 includes a tubular upright portion 26 that extends upwardly from orthogonally intersecting U-shaped retainer portions 27 having open lower ends 28. Extending inwardly from the outer bottom ends of each of the U-shaped retainer portions 27 are a pair of ears 29 spaced apart by a distance $d_1$. The base portion 18 comprises a first elongated U-shaped channel 31 and a second elongated U-shaped channel 32 orthogonally engaged therewith. Each of the first and second channels 31 and 32, is formed by an upper wall 33 and downwardly extending flexible, resilient side walls 34. Projecting inwardly from the bottom ends of the side walls 34 are flange portions 35 while outer surfaces at the bottom ends of the side walls 34 are separated by a distance $d_2$. A slot 37 extends through lower portions of the side walls 34 of a central portion 38 of the first channel 31 to a depth providing a remaining side wall width w. Another slot 41 extends through the upper wall 33 and side walls 34 of a central portion 42 of the second channel 32. The slot 41 extends into the side walls 34 of the central portion 42 a distance w. Upon engagement of the first and second channels 31, 32 the side wall portions of the second channel 32 below the slot 41 are received by the slot 37 in the first channel 31. Similarly, the remaining side wall portions of the first channel 31 above the slot 37 are received by the slot 41 in the second channel 32.

Open ends 45 of the first and second channels 31, 32 are closed by end caps 46 shown in FIGS. 4 and 5. Each end cap 46 has a stem 47 that conforms to the inner surface of the members 31, 32 and is received by an open end 45 thereof. Extending outwardly from opposite sides of the stems 47 are tab portions 48 that are received by openings 49 in the side walls 34 of the channels 31, 32. Projecting downwardly from each end cap 46 is a contact leg 51 that extends below the bottom edges of the side walls 34 after entry of the end caps 46 into the channels 31, 32.

As shown in FIGS. 6–9, the collar assembly 23 includes a collar member 53 and a lower portion 52 of the upper standard member 22 received thereby. Formed within the coupling assembly 23 is a retainer slot 54 including a first axially directed slot portion 55 extending over the full length of the inner surface of the lower portion 52; a second axially directed slot portion 56 formed in the inner surface of the collar member 53, extending from a lower end thereof, and circumferentially spaced from the first slot portion 55; and a transverse slot portion 57 formed in the inner surface of the collar member 53 and joining inner ends of the first and second slot portions 55, 56. Accommodated by the retainer slot 54 is an outward projection 58 on the outer surface of the lower tubular member 21 adjacent to its upper end. An internal shoulder 59 on the collar member 53 abuts the bottom end of the upper tubular member 22. Also defined by the inner surface of the collar member 53 is a flexible tab 61 formed by slots projecting into the shoulder 59. A securing screw 65 includes a manually operable knob 66 and a threaded stem 67 that threadedly engages the collar member 53 and has an inner end abutting the flexible tab 61.

Shown in greater detail in FIGS. 10–14 is the coupling assembly 25 (FIG. 1) that joins the standard 14 to the fan assembly 12. Forming the coupling 25 is a head 71 fixed to the fan assembly 12 and a neck 72 fixed to the upper end of the upper tubular member 22. The head 71 includes a yoke portion 72 having an open entry slot portion 73 terminating with a circular socket 74 (FIG. 11). Formed on an outer surface of one arm of the yoke 72 is a cam portion that provides an engagement cam surface 70 and a stop surface 69. The neck 72 includes bifurcated arms 75 joined by a pin 76. Also formed near the bottom of the neck 72 and extending between the legs 75 is a flexible, resilient actuator latch arm 81. An end of the arm 81 opposite a free end 82 thereof is supported by a stem portion 83 at the base of the neck 72. Extending upwardly from a mid portion of the latch arm 81 is a latch portion stop 84. The socket 74 has a diameter D greater than the width t of the slot 73. Similarly, the pin 76 has a circularly cylindrical surface portion 85 corresponding to the diameter D so as to permit fitted rotation thereof within the socket 74. However, surfaces 86 on opposite sides of the pin 76 intersect the surface portion 85 so as to create pin boundaries that lie between planes separated by a distance slightly less than t.

During assembly of the pedestal 13, the central portion 38 of the first channel 31 is inserted into the U-shaped recess defined by one of the retainer portions 27. During the insertion, the flexible side walls 34 of the first channel 31 are deflected inwardly by engagement with the ears 29 and after moving thereby spring outwardly into original positions so as to be securely retained thereby. The central portion 42 of the second channel 33 then is similarly inserted into the other retainer portion 27 until becoming engaged with another two pairs of ears 29. As noted above, the engagement of the first and second channels 31, 32 is accommodated by the fitted first and second slots 37 and 41 therein. During insertion of the end caps 46, the flexible side walls 34 of the channels 31, 32 are deflected outwardly by engagement with the projecting tab portions 48 until reaching alignment with the openings 49 in the side walls 44 which then spring inwardly to move the tab portions 48 into the openings 49. Although the bottom edges of the retainer portions 27 extend below the bottom edges of the channels 31, 32, the pedestal 13 provides a stable base because of the contact portions 51 on the end caps 46 that project below the bottom edges of the retainer portions 27.

During assembly of the standard 14, the upper end of the lower tubular member 21 is inserted into the collar member 53. Since the outer diameter of the lower tubular member 21 is substantially equal to the inner diameter of the collar member 53, this insertion process requires axial alignment between the projection 58 on the member 21 and the second axial slot 56 in the inner surface of the collar member 53. After the projection 58 reaches the inner end of the second axial slot 56, the collar 23 is rotated on the lower member 21 until the projection 58 reaches alignment with the first axial slot portion 55 in the inner surface of the upper tubular member 22. During this relative rotational movement, transverse movement of the projection 58 is accommodated by the transverse slot portion 57. Upon reaching those relative engaged positions, the total length of the standard 14 can be selectively adjusted by movement of the lower 21 within the upper member 22 during which relative movement between the projection 58 and the upper member 22 is accommodated by the first slot portion 55. However, in that engaged position, separation of the upper and lower members 22, 21 is prevented by engagement between the projection 58 and the lower side wall of the transverse slot 57. After movement of the inner member 21 within the upper member 22 has established a desired total length for the standard 14, that length then is fixed by turning the securing screw 65 inwardly into the collar member 53 to engage and force the flexible tab 61 against the lower member 21 thereby preventing further movement thereof with respect to the upper member 22. To achieve separation of the upper and lower members 22 and 21, the collar 23 must be rotated into a removal position wherein the projection 58 is in axial alignment with the second axial slot 56.

Figure 13:
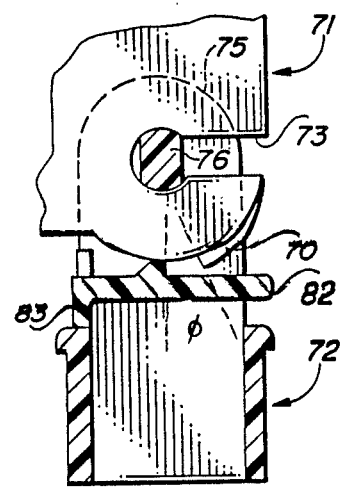
FIG. 13 is a sectional view similar to FIG. 10 with the coupling assembly in a different position.
Figure 14:
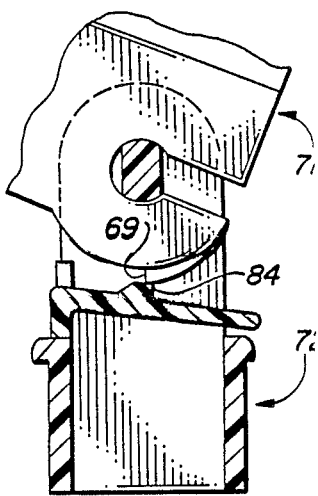
FIG. 14 is a cross sectional view showing yet another operating position of the coupling assembly of FIG. 10.

To mount the fan assembly 12 on the upper end of the standard 14, the head 71 is engaged with the neck 72. Engagement requires relative angular movement between the head 71 and the neck 72 to establish a predetermined relative angular position shown in FIG. 10 with the entry slot 73 of the yoke 72 aligned with the surfaces 86 on the neck 72. In those relative positions, the pin 76 can be inserted through the entry slot 73 into the socket 74 as shown. The head 71 and attached fan assembly 12 then is rotated counterclockwise, as shown in FIGS. 13 and 14 into other relative angular positions. However, in all those other relative angular positions, separation of the head 71 from the neck 72 is prevented because the entry slot 73 is no longer aligned with the minimum width portion t of the pin 76. During initial relative angular movement between the head 71 and the neck 72, the cam surface 70 on the yoke 72 engages the projecting latching stop portion 84 of the latch arm 81 causing downward deflection of the free end 82 as shown in FIG. 14. After the cam portion 70 has passed the latching portion 84 the resilient latch arm 81 returns to its original position as shown in FIG. 13. In that position, engagement between the stop portion 84 on the latch arm 81 and the stop surface 69 on the cam 70 limits further clockwise rotation of the head 71 on the neck 72 to prevent return to the predetermined relative angular positions required for separation. Counterclockwise rotation of the head 71 on the neck 72 as shown in FIGS. 13 and 14 is ultimately limited by engagement of the cage 17 with the upper member 22 of the standard 14. Thus, the coupling 25 limits relative angular position orientation between the fan assembly 12 and the standard 14 within a given angular range $\phi$ as shown in FIG. 13. Any selected angular position can be fixed by turning the set screw 81 inwardly in the leg 75 to engage the yoke 72.

When disengagement of the fan assembly 12 from the standard 14 is desired, the free end 82 of the latch arm 81 is pushed downwardly as shown in FIG. 14 to thereby move the stop portion 84 out of the travel path of the cam 70 on the yoke 72. The head 71 then is rotated clockwise, as shown in FIG. 14, to align the entry slot 73 with the minimum width section of the pin 76. Once alignment is achieved, the head 71 can be removed from the neck 72 by passing the reduced pin section t out of the slot 73 in the yoke 72.

Obviously, many modifications and variations of the present invention are possible in light of the above teachings. It is to be understood, therefore, that the invention can be practiced otherwise than as specifically described.

What is claimed is:

1. A portable electric appliance comprising:
   standard means;
   fan means supported by one end of said standard means and comprising a rotatable blade assembly, and an electrical motor operatively coupled to said blade assembly; and
   pedestal means supporting an end of said standard means opposite to said one end and comprising: a hub having a tubular upright portion retaining said end of said standard means opposite to said one end; a base portion defining a pair downwardly facing, orthogonally intersecting first and second U-shaped retainer portions; a first elongated U-shaped channel member having an upper wall, a pair of side walls projecting downwardly from said upper wall, and a central portion retained in said first retainer portion and having a slot extending transversely through lower portions of said side walls; and a second elongated U-shaped channel member having an upper wall, a pair of side walls projecting downwardly from said upper wall, and a central portion retained in said second retainer portion and having a slot extending through its said upper wall and upper portions of its said side walls, and wherein said slot in said first channel member engages said slot in said second channel member.

2. An appliance according to claim 1 wherein said side walls of said first and second channel members are flexible and resilient, each of said retainer portions has an open lower end defining a pair of spaced apart inwardly projecting ears, and the distances between the outer bottom ends of said side walls of said first and second channel members are greater, respectively, than the spacing between said ears of said first and second retainer portion such that during insertion of said first and second channel members into said first and second retainer portions said lower ends of said side walls are first deflected inwardly by engagement with said ears and then after passing thereby spring outwardly so as to be retained thereby.

3. An appliance according to claim 2 wherein said lower ends of said side walls have inwardly directed flange portions.

4. An appliance according to claim 2 wherein said channel members have open ends and including an end cap closing each said open end, said end caps having contact portions that project below said lower ends of said side walls.

5. An appliance according to claim 4 wherein each of said side walls has an opening adjacent each said open end, said end caps each extend within said open end and has tab portions that are received by said openings, and the distance between the outer ends of said tab portions is greater than the spacing between said side walls such that during insertion of said end caps into said open ends said side walls are first deflected outwardly by engagement with said tab portions and then upon alignment thereof with said openings spring inwardly to move said tab portions into said openings.

6. A portable electrical appliance comprising:
   pedestal means;
   fan means comprising a rotatable blade means, and a motor operatively coupled to said blade means; and
   standard means extending between said fan means and said pedestal means; said standard means comprising an elongated lower cylindrical member having a lower end supported by said pedestal means, an elongated upper tubular member having one end supporting said fan means and adapted for axial movement along an outer surface of said lower member, securing means for securing said upper member to said lower member so as to prevent said longitudinal movement, and a collar means at an opposite end of said upper member and receiving an upper end of said lower member; said collar means adapted for relative rotational movement with respect to said lower member between a removal position and an engaged position, and wherein said collar means is adapted in said removal position to permit axial separation of said opposite end of said upper member from said upper end of said lower member and in said engaged position to prevent said axial separation thereof.

7. An appliance according to claim 6 wherein an inner surface of said upper member slidably engages an outer surface of said lower member, said collar means is adapted for rotation on said lower member: an inner surface of said collar means defines a retainer slot having a first axially directed slot portion extending from an upper end of said inner surface; a second axially directed slot portion extending from a lower end of said inner surface, an inner end of said first slot portion being circumferentially spaced apart from an inner end of said second slot portion; and a transverse slot portion joining said inner ends of said first and second slot portions; and said outer surface of said lower tubular member has a projection adapted for travel through said first slot portion during said axial sliding movement of said upper tubular member, through said second slot portion during said axial separation of said upper member from said lower member, and through said transverse slot portion during said rotational movement of said collar means between said removal and engaged positions.

8. An appliance according to claim 7 wherein said collar means comprises a lower portion of said upper member and a collar member demountably mounted thereon, said first slot portion is formed in an inner surface of said lower portion of said upper member, and said second and transverse slot portions are formed in an inner surface of said collar member.

9. An appliance according to claim 8 wherein said first slot portion extends along substantially the entire length of said upper member.

10. An appliance according to claim 7 wherein said securing means comprises a screw for applying a retaining force between said upper and lower members.

11. An appliance according to claim 10 wherein said collar means comprises a lower portion of said upper member and a collar member demountably mounted thereon, said first slot portion is formed in an inner surface of said lower portion of said upper member, and said second and transverse slot portions are formed in an inner surface of said collar member.

12. An appliance according to claim 11 wherein said securing means further comprises a flexible tab defined by said inner surface of said collar member, and said screw is threadedly engaged in said collar member and disposed for movement therein into engagement with said flexible tab so as to cause deflection thereof into forcible engagement with said lower member to thereby prevent said sliding movement of said upper member.

13. A portable electrical appliance comprising:
pedestal means;
standard means having a lower end supported by said pedestal means;
fan means comprising rotatable blade means, and a motor operatively coupled to said blade means; and
coupling means securing said fan means to an upper end of said standard means; said coupling means comprising a neck means attached to said upper end of said standard means, a head means pivotally mounted on said neck means and attached to said fan means, connection means releaseably securing said head means to said neck means, stop means for limiting the angular movement of said head means on said neck means, and set means for fixing the angular position of said head means on said neck means; and wherein said connection means is adapted to permit engagement or disengagement of said head and neck means with a predetermined relative angular position existing therebetween and to prevent engagement or disengagement of said head and neck means with relative angular positions other than said predetermined position existing therebetween.

14. An appliance according to claim 13 including latch means manually actuatable between release and latching positions, said latch means adapted in said latching position to prevent angular movement of said head means into said predetermined relative angular position and adapted in said release position to permit movement of said head means into said predetermined relative angular position.

15. An appliance according to claim 14 wherein said connection means comprises a pin portion of one of said head or neck means, and a yoke portion on the other of said head or neck means and receivable by said pin portion with said predetermined relative angular position existing between said head and neck means.

16. An appliance according to claim 15 wherein said yoke portion includes a circularly cylindrical socket surface portion having a diameter D, and an open ended slot intersecting said socket surface portion and having a width t less than said diameter D; and said pin portion has a circularly cylindrical outer surface portion with a diameter corresponding to said diameter D so as to permit fitted rotation of said outer surface portion within said socket surface portion, and intersecting surface means intersecting said outer surface portion so as to create for said pin portion boundaries that lie between planes separated by a distance less than t.

17. An appliance according to claim 15 wherein said pin portion is defined by said neck means and said yoke portion is defined by said head portion, and said latch means comprises an actuator secured to said neck portion and an engagement portion of said yoke portion, and said engagement portion is adapted for releaseable engagement with said actuator.

18. An appliance according to claim 17 wherein said actuator comprises an arm defining a latch portion and manually movable between said latching and release positions, said latch portion adapted in said latching position to engage said engagement surface and prevent movement of said head means into said predetermined relative angular position.

19. An appliance according to claim 18 wherein said arm is biased in said latching position, said engagement surface is formed by a cam surface on said yoke, and said cam surface is adapted to engage said latch portion and deflect said arm into said release position during angular movement of said head means between said predetermined angular position and said other angular positions.

20. An appliance according to claim 19 wherein said stop means comprises a latching surface of said latch portion that engages said engagement surface to prevent movement of said head means into said predetermined relative angular position.

* * * * *